United States Patent
Arita et al.

(10) Patent No.: US 7,428,690 B2
(45) Date of Patent: Sep. 23, 2008

(54) PACKET COMMUNICATION APPARATUS

(75) Inventors: Hiroshi Arita, Hitachi (JP); Yasuhiro Nakatsuka, Tokai (JP); Kotaro Shimamura, Hitachinaka (JP); Yasuwo Watanabe, Hitachiota (JP)

(73) Assignee: Renesas Technology Corp., Tokyo (JP)

( * ) Notice: Subject to any disclaimer, the term of this patent is extended or adjusted under 35 U.S.C. 154(b) by 535 days.

(21) Appl. No.: 10/921,879

(22) Filed: Aug. 20, 2004

(65) Prior Publication Data

US 2005/0068897 A1 Mar. 31, 2005

(30) Foreign Application Priority Data

Sep. 26, 2003 (JP) ............................. 2003-335064

(51) Int. Cl.
*G11C 29/00* (2006.01)
(52) U.S. Cl. ...................................... 714/766; 714/769
(58) Field of Classification Search ................ 714/758, 714/766, 769
See application file for complete search history.

(56) References Cited

U.S. PATENT DOCUMENTS

| 5,500,864 | A | * | 3/1996 | Gonia et al. | 714/807 |
| 6,880,048 | B1 | * | 4/2005 | Lemke | 711/154 |
| 6,968,209 | B1 | * | 11/2005 | Ahlgren et al. | 455/558 |
| 7,003,702 | B2 | * | 2/2006 | Budd et al. | 714/52 |
| 7,219,211 | B1 | * | 5/2007 | Greene et al. | 711/216 |

FOREIGN PATENT DOCUMENTS

| JP | 4-352054 | 12/1992 |
| JP | 5-183603 | 7/1993 |
| JP | 10-190481 | 7/1998 |
| JP | 2001-111558 | 4/2001 |

OTHER PUBLICATIONS

Brustoloni et al., Copy Emulation in Checksummed, Multiple-Packet Communication, 1997, IEEE, pp. 1122-1130.*
Maclean et. al., An Outboard Processor For High Performance Implementation of Transport Layer Protocols, 1991, IEEE, pp. 1728-1732.*

* cited by examiner

*Primary Examiner*—Mujtaba K. Chaudry
(74) *Attorney, Agent, or Firm*—McDermott Will & Emery LLP

(57) ABSTRACT

A packet communication apparatus, which includes a CPU, a memory, and a packet communication circuit, acts as an interface between a network-connected controlled object and a network terminal that remotely monitors and controls the controlled object, and transmits and receives a packet between the controlled object and the network terminal, further includes a copy and operation unit that is a hardware unit for executing the checksum calculation to check for a packet error and the copy operation. The copy and operation unit performs the packet data copy operation and the checksum calculation simultaneously between a sending buffer/receiving buffer, formed in the memory and used by the packet communication circuit, and a work area used by a communication processing program, thus reducing the load of the CPU and increasing the communication processing speed.

12 Claims, 10 Drawing Sheets

PACKET COMMUNICATION APPARATUS

BACKGROUND OF THE INVENTION

The present invention relates to a packet communication apparatus that transmits and receives data that is divided into packets, and more particularly to packet data copy means and checksum calculation means used for transmitting and receiving packet data.

Most communications via the Internet and LANs are packet communications based on the TCP/IP protocol.

TCP/IP consists of a hierarchy of programs for protocol processing. For example, a packet received by a communication circuit, which works as the network interface, is processed sequentially by a hierarchy of programs. That is, the packet is passed to the Ethernet (registered trademark) driver, received by IP, received by TCP or UDP (User Datagram Protocol), and then processed by application software programs.

In a packet transmission, a packet is transmitted from the communication circuit by performing the above processing in a reverse order.

In addition, the IP or UDP software calculates the checksum of the header, and the TCP software calculates the checksum of the header and the data, to check for a communication error.

However, because the checksum calculation is performed for the all the packets when data is transmitted and received, the software processing of the checksum calculation requires long time and prevents the transmission/reception performance from being improved.

Some methods are proposed to solve this problem. For example, considering the fact that the reception amount is larger than the transmission amount on a network terminal, a method is proposed for calculating the checksum via hardware at reception time to speed up the calculation (For example, see JP-A-10-190481 (pages 3-4, FIGS. 2-4) and JP-A-2001-111558 (pages 2-4, FIG. 1, FIGS. 3-5)

SUMMARY OF THE INVENTION

However, network terminals are required to improve the transmission performance because they include a web server that is to transmit more packets. Today, however, network terminals are mainly receiving data.

A high-speed CPU, if used to meet the requirement for increasing the speed of the transmission processing, increases the network terminal cost.

It is an object of the present invention to provide a packet communication apparatus that has means for reducing the CPU processing load and increasing the transmission/reception speed even when a low-cost, low-speed CPU is used.

To achieve the above object, a packet communication apparatus is proposed that comprises a CPU, a memory, and a packet communication circuit, acts as an interface between at least one network-connected controlled object and at least one network terminal that remotely monitors and controls the controlled object, and transmits and receives packets between the controlled objects and the network terminals. The CPU comprises communication middleware that encapsulates data into transmission packets and places the transmission packets in a work area in the memory. The packet communication apparatus further comprises a copy unit that copies the transmission packet placed in the work area to descriptors in the memory. The packet communication circuit transmits the transmission packets, which is obtained via a corresponding device driver and is stored in the descriptors in the memory, to the controlled objects or the network terminals. The packet communication circuit transfers reception packets, received from the controlled objects or the network terminals, to descriptors in the memory via the corresponding device driver. The packet communication apparatus comprises the copy unit that copies the reception packets, which are transferred to the descriptors in the memory, to the work area in the memory. The CPU comprises the communication middleware that de-capsulates the reception packets, which are placed in the work area, and obtains data.

The present invention also proposes a packet communication apparatus that comprises a CPU, a memory, and a packet communication circuit, acts as an interface between at least one network-connected controlled object and at least one network terminal that remotely monitors and controls the controlled object, and transmits and receives packets between the controlled objects and the network terminals. The CPU comprises communication middleware that encapsulates data into transmission packets and places the transmission packets in a work area in the memory. The packet communication apparatus further comprises a copy and operation unit that copies the transmission packets placed in the work area to descriptors in the memory and, at the same time, executes a predetermined operation for the transmission packets. The packet communication circuit transmits the transmission packets, which is obtained via a corresponding device driver and is stored in the descriptors in the memory, to the controlled objects or the network terminals. The packet communication circuit transfers packets, which are received from the controlled objects or the network terminals, to descriptors in the memory via the corresponding device driver. The packet communication apparatus comprises a copy and operation unit that copies the reception packets, which are transferred to the descriptors in the memory, to the work area in the memory and executes a predetermined operation for the reception packets. The CPU comprises communication middleware that de-capsulates the reception packets, which are placed in the work area, and obtains data.

The CPU further comprises switching request means for switching the copy and operation unit among three modes, that is, a mode in which only the packet is copied, a mode in which only the predetermined operation is executed for the packet, and a mode in which the packet is copied and the predetermined operation is executed.

More specifically, the operation unit that executes the predetermined operation is a checksum calculation unit for the packets. This checksum calculation unit includes a checksum calculation circuit that performs calculation for a variable-length data target.

When a packet in the work area has no checksum information, the copy and operation unit writes a checksum calculation result in the packet in the descriptor to which the packet is copied and in the packet in the work area from which the packet is copied.

When a packet in the work area has no checksum information, it is also possible that the copy operation and the checksum calculation of the copy and operation unit are executed separately, that is, the communication middleware first calculates only the checksum, the result is stored in the packet as the checksum information, and the packet with the checksum information in the work area is copied to the descriptor.

The packet communication apparatus using the memory copy method according to the present invention, has a hardware unit for performing the copy operation and the checksum calculation, which increase the CPU load, during the TCP/IP communication processing, enables the copy operation and the checksum calculation to be executed simultaneously, and increases the communication processing performance.

The memory copy method according to the present invention can increase the speed of the copy operation and the checksum calculation not only in the packet reception processing but also in the transmission processing and therefore make the transmission/reception processing faster.

As a result, even when a web server required to perform the transmission/reception processing frequently is installed in a network terminal, a relatively slow existing CPU can be used with the conventional software asset inherited unchanged.

The extra CPU power can be used for other processing and therefore new functions can be added to a product.

Other objects, features and advantages of the invention will become apparent from the following description of the embodiments of the invention taken in conjunction with the accompanying drawings.

DETAILED DESCRIPTION OF THE EMBODIMENTS

Next, an embodiment of a packet communication apparatus according to the present invention will be described with reference to FIG. 1 to FIG. 9.

Figure 1:
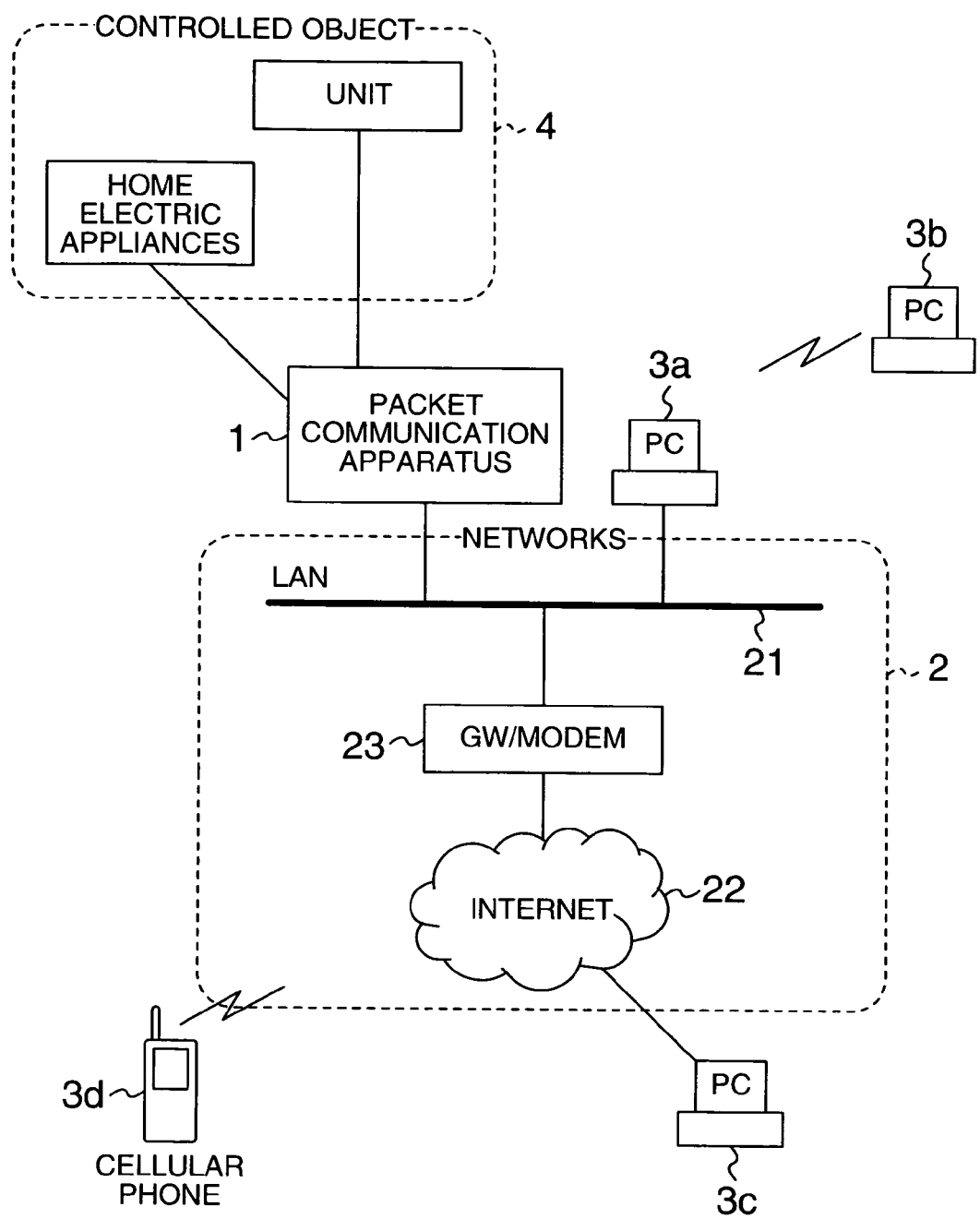
FIG. 1 is a diagram showing an example of the configuration of a remote monitor/control system to which a packet communication apparatus according to the present invention is applied.

FIG. 1 is a diagram showing an example of the configuration of a remote monitor/control system to which the packet communication apparatus according to the present invention is to be applied.

Conventionally, the Internet is means primarily for obtaining information in external web pages while staying at home. Recently, we can easily create an always-on Internet environment using ADSL or FTTH. In an environment where in-house apparatuses are connected via an Ethernet (registered trademark) network to build a LAN and the always-on Internet connection is established via ADSL or FTTH, we can obtain information on the apparatuses in the home for monitoring and controlling the status when we are away from home. There is a rapidly increasing need for a remote monitor/control system via ADSL and FTTH.

A remote monitor/control system in this embodiment comprises a packet communication apparatus 1, networks 2, network terminals 3 such as personal computer PCs and cellular phones, and controlled objects 4 such as home electric appliances and industrial control units. The packet communication apparatus 1 and the controlled objects 4 may be either integrated or connected via cable or radio waves.

The packet communication apparatus 1 and the network terminals 3, which are connected via the networks 2, transmit and receive packets complied with the TCP/IP protocol.

The packet communication apparatus 1 functions as the interface between the controlled objects 4 and the networks 2. The network terminals 3 remotely monitor and control the statuses of the controlled objects 4 via the networks 2.

The packet communication apparatus 1 includes a web server that allows the user to perform real-time remote monitoring or real-time control using a standard web browser provided for accessing the Internet from the network terminals 3. The packet communication apparatus 1 is required to transmit and receive packets in real time for web server processing, meaning that the load of the packet communication apparatus 1 becomes heavier.

The present invention provides means for reducing the CPU load added by the packet transmission/reception processing and increasing the communication capability of the packet communication apparatus 1.

The networks 2 comprise a LAN 21, the Internet 22, and a gateway GW or a modem 23 that connects them together. The gateway GW or the modem 23 functions as the interface between the LAN 21 and the Internet 22. The networks 2 comprise wire-connected PC 3a and PC 3c that are connected via cables or optical fibers as well as wireless terminals such as a cellular phone 3d and a network terminal 3b connected via a wireless LAN.

On the LAN 21, an Ethernet (registered trademark) packet, complied with IEEE 802.3 and generated by encapsulating a TCP/IP packet, is used for communication. On the Internet 22, Ethernet (registered trademark) packets as well as packets compatible with the ATM technology and the frame relay technology are used for communication.

Figure 2:
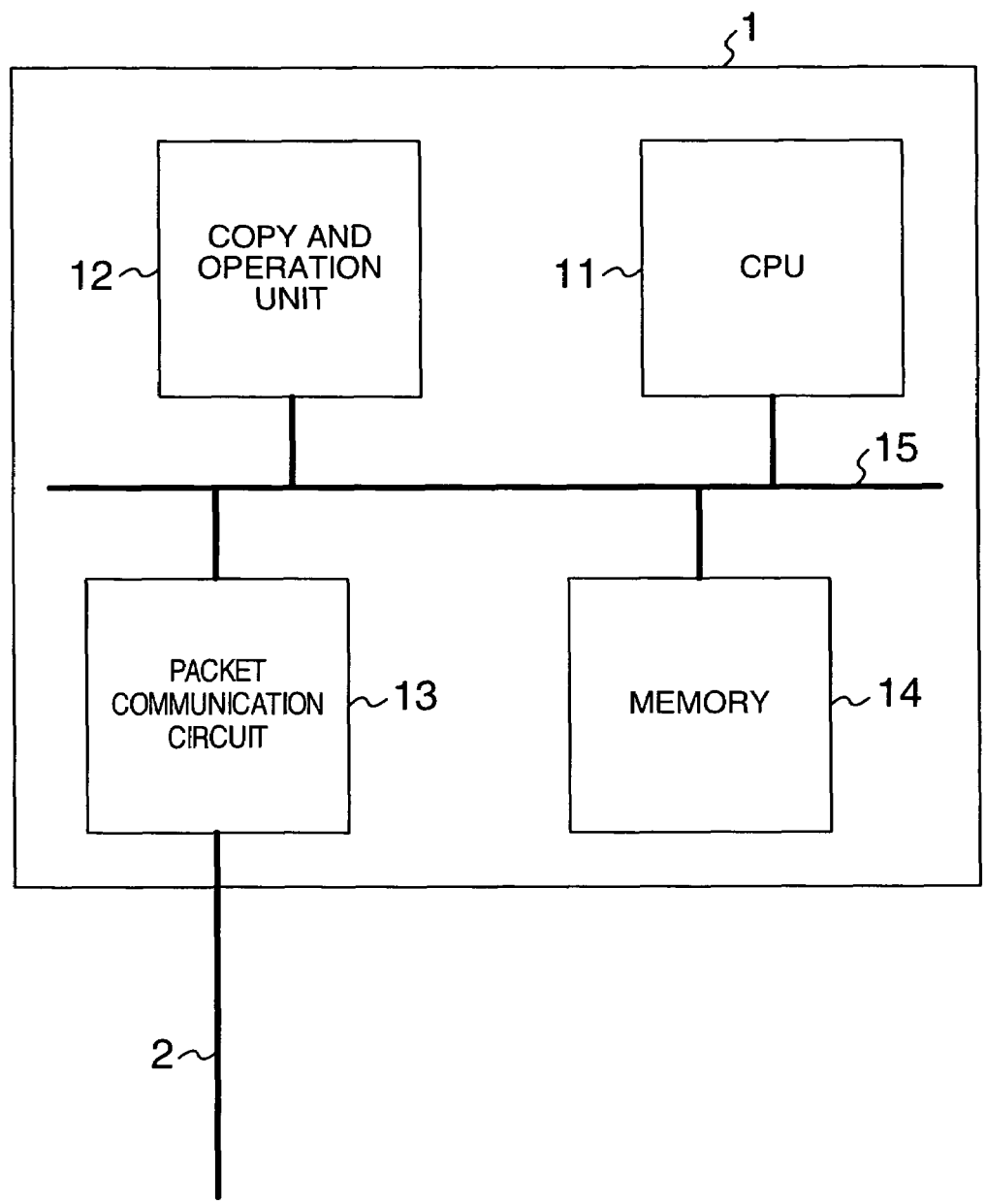
FIG. 2 is a block diagram showing the configuration of one embodiment of the packet communication apparatus according to the present invention.

FIG. 2 is a block diagram showing the configuration of one embodiment of the packet communication apparatus according to the present invention.

The packet communication apparatus 1 comprises a CPU 11, a copy and operation unit 12, a packet communication circuit 13, a memory 14, and a bus 15 that connects them together.

Figure 10:
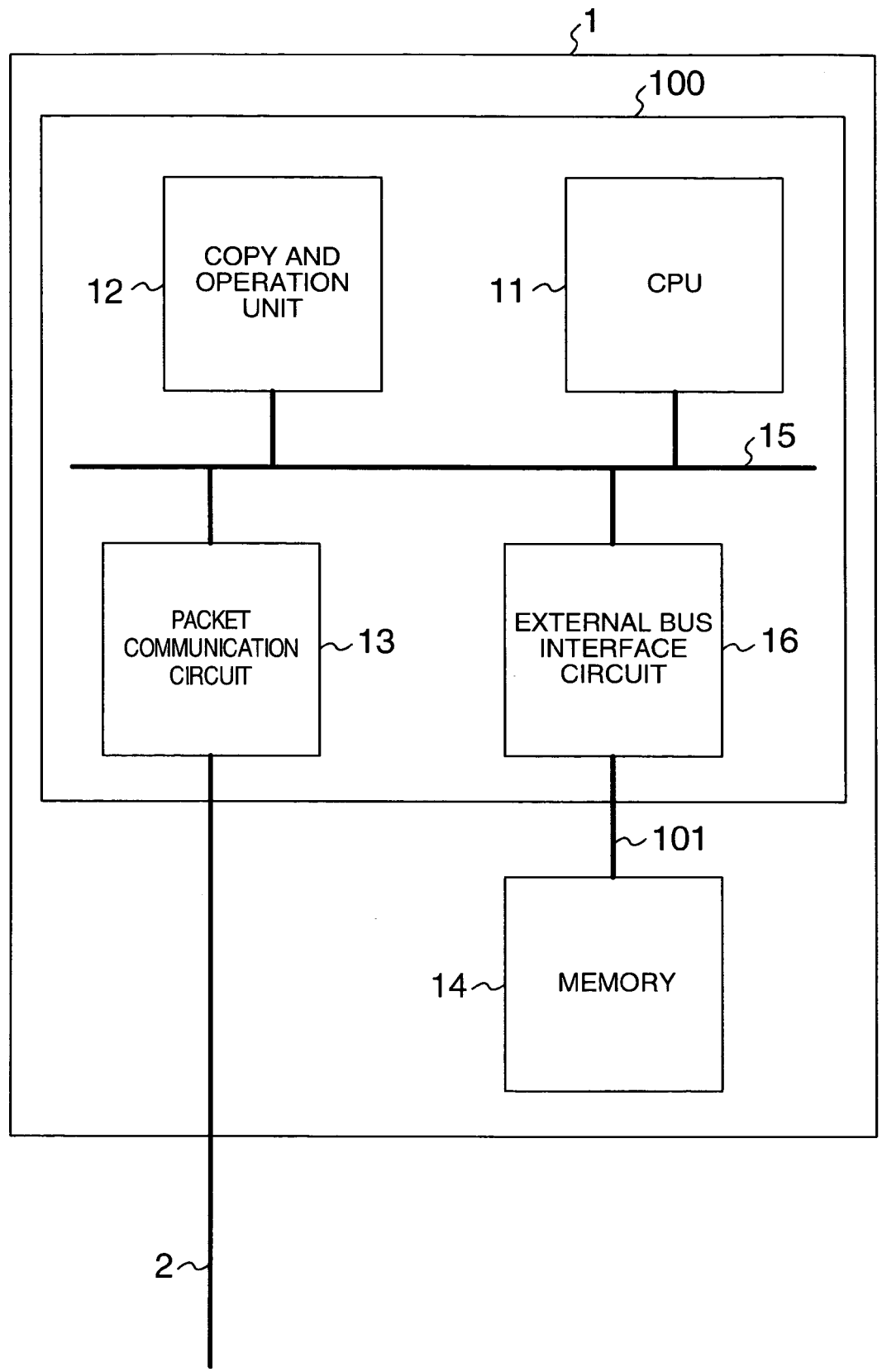
FIG. 10 is a block diagram showing a configuration, different from that in FIG. 2, of one embodiment of the packet communication apparatus according to the present invention.

Another configuration of the packet communication apparatus 1, such as the one shown in FIG. 10, is also available in which a memory is externally provided.

Referring to FIG. 10, the packet communication apparatus 1 comprises a packet communication LSI 100, the memory 14, and an external bus 101 that connects the packet communication LSI 100 to the memory 14.

The packet communication LSI 100 comprises the CPU 11, the copy and operation unit 12, the packet communication circuit 13, an external bus interface circuit 16, and the bus 15 that connects them together. The external bus interface circuit 16 is a bridge circuit that connects the bus 15 to the external bus 101.

Because the operation of the packet communication apparatus in FIG. 2 and the operation of the packet communication apparatus in FIG. 10 are the same, the following describes the operation of the packet communication apparatus in FIG. 2 in detail.

The packet communication circuit 13, connected to the networks 2, performs packet communication via the LAN 21 and using Ethernet (Registered trademark) packets.

Figure 3:
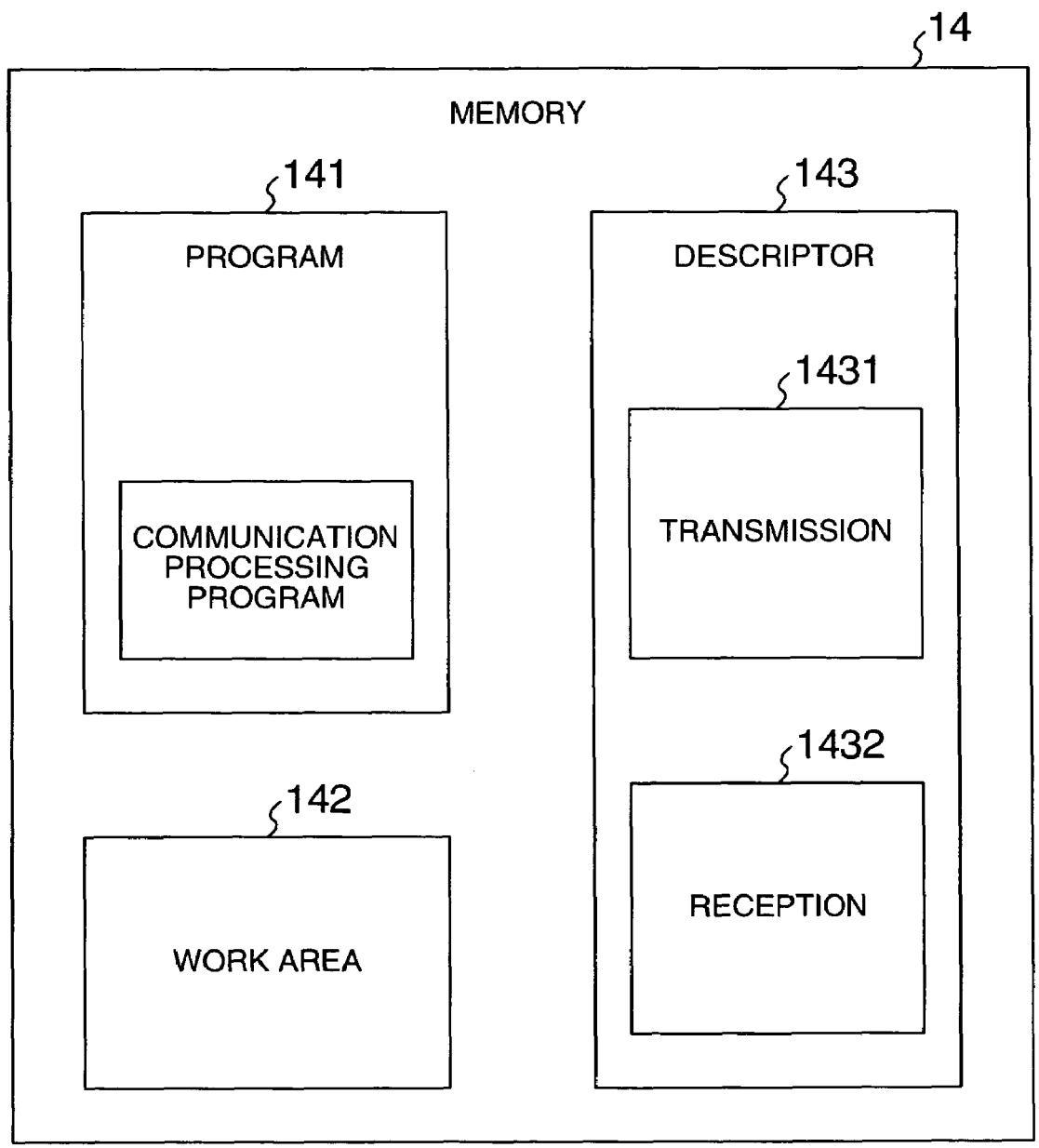
FIG. 3 is a block diagram showing the functional configuration of the programs stored in a memory of the packet communication apparatus according to the present invention.

FIG. 3 is a block diagram showing the functional configuration of the programs stored in the memory of the packet communication apparatus according to the present invention.

The memory 14 stores a series of programs 141 that include the transmission packet generation procedure and the reception packet processing procedure executed in the CPU 11; a work area 142 used as the data area; and descriptors 143 that hold data to be transmitted or received by the packet communication circuit 13.

The descriptors 143 include transmission descriptors 1431 that hold data to be transmitted by the packet communication circuit 13 and reception descriptors 1432 that hold data received by the packet communication circuit 13.

Figure 4:
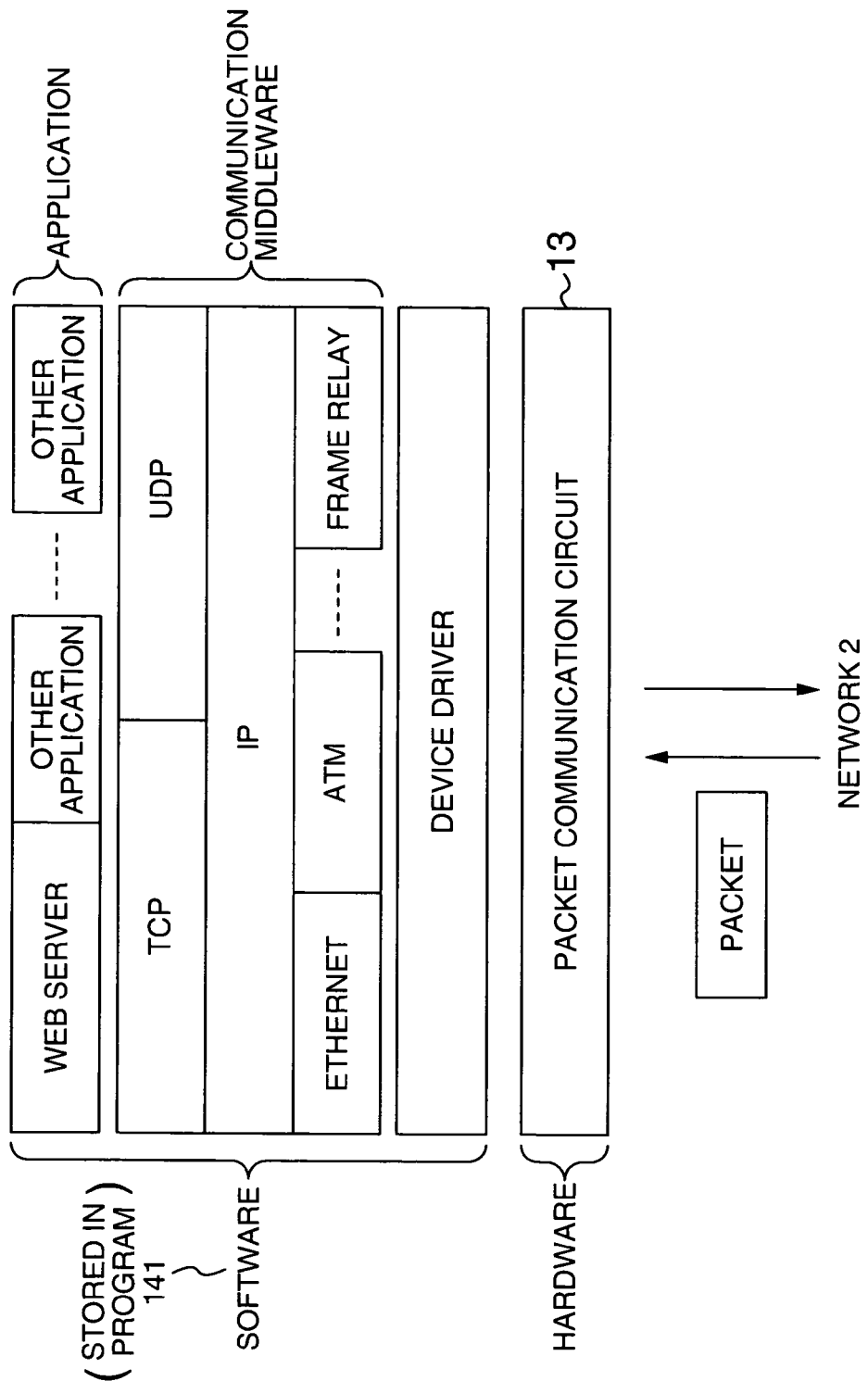
FIG. 4 is a diagram showing the structure of the TCP/IP communication protocol used in the packet communication apparatus according to the present invention.

FIG. 4 is a diagram showing the structure of the TCP/IP communication protocol used by the packet communication apparatus according to the present invention.

The CPU 11 executes the programs 141. That is, the CPU 11 executes the application softwares such as the web server, the communication middlewares such as TCP/IP, and the software such as device drivers, all of which are stored in the memory 14, for processing transmission packets and reception packets using the work area 142 in which data used at execution time is stored.

The communication processing software is divided into two types: one is the device drivers that depend on the packet communication circuit 13 that is the hardware and the other is the communication middlewares that do not depend on the hardware.

The device driver is created for each hardware unit. Because the device drivers access the descriptors 143 accessed by the packet communication circuit 13, the communication middlewares are required only to transmit and receive data to and from the work area 142. As a result, the communication middlewares minimize the need for the application softwares, such as a web server, to be concerned with communication processing such as that of TCP/IP and, therefore, the application softwares can be made highly abstract. This makes it easy to create application softwares and increases program portability.

However, the device driver is required to copy reception packets from the reception descriptors 1432 to the work area 142 and to copy transmission packets from the work area 142 to the transmission descriptors 1431. This increases the overhead.

Figure 5:
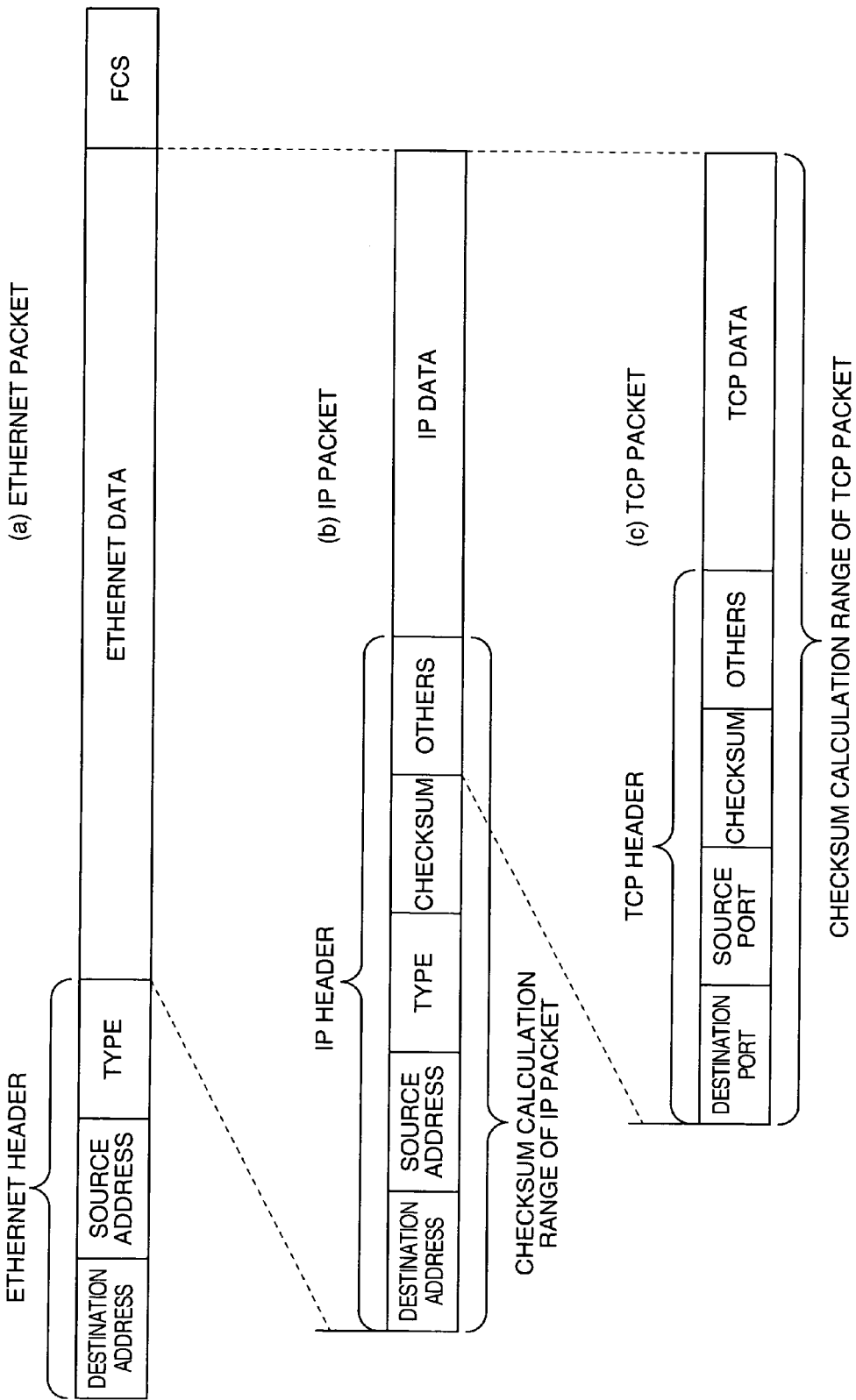
FIG. 5 is a diagram showing an example of the configuration of a TCP/IP communication packet that the packet communication apparatus according to the present invention encapsulates using an Ethernet (registered trademark) packet for transmission and reception.

FIG. 5 is a diagram showing an example of the configuration of a packet that is used when the packet communication apparatus 1 according to the present invention encapsulates a TCP/IP communication packet with an Ethernet (registered trademark) packet for transmission and reception.

To transmit data, the packet communication apparatus 1 encapsulates transmission data first with a TCP header (FIG. 5(*c*), then with an IP header (FIG. 5(*b*)), and then with an Ethernet (registered trademark) header (FIG. 5(*a*)) to create a packet for transmission. When encapsulating data, the type of packet used for encapsulation is added to each header as the type information.

When the packet communication apparatus 1 receives data, the processing is performed in reverse order. That is, the packet communication apparatus 1 references the type information within the header and decapsulates the Ethernet (registered trademark) packet, the IP packet, and the TCP packet in this order for receiving data.

When a packet is encapsulated, TCP (UDP) and IP calculate the checksum to determine if the packet is correct.

As shown in FIG. 5, the checksum calculation range is the whole TCP packet composed of the TCP header and the TCP data for a TCP packet, and only the header for UDP and IP.

The transmitting side calculates the checksum when a packet is encapsulated and adds the calculation result to the header as the checksum information.

The receiving side calculates the checksum of the range including the checksum information. If the result is 0, the transmission is determined as normal; if the result is not 0, the transmission is determined as an error.

The latest micro CPU is a 32-bit CPU that calculates 32 bits at a time. On the other hand, the checksum calculation, which is a 16-bit one's complement calculation, is processed 16 bits at a time even on the 32-bit CPU 11.

In addition, the checksum is calculated during both transmission processing and reception processing. For TCP, the checksum is calculated for the whole packet. Therefore, the checksum calculation increases the load of the CPU 11.

As a result, the packet copy operation and the checksum calculation decrease the communication performance during packet transmission and reception.

According to the present invention, the copy operation and the checksum calculation are performed by the copy and operation unit 12 implemented as a hardware unit that concurrently performs both operations in parallel to increase the communication performance.

Using the hardware, the software modification is limited to only the device drivers that depend on the hardware, to simplify the software development.

In addition, the checksums are calculated 32 bits at a time using effectively the memory access width so as to reduce the overhead and increase the communication performance.

The copy and operation unit 12 executes the copy operation and checksum calculation simultaneously to reduce the overhead of the CPU 11.

The copy and operation unit 12 has three modes: the mode in which the copy operation and the checksum calculation are executed simultaneously, the mode in which only the copy operation is executed, and the mode in which only the checksum calculation is executed.

Figure 6:
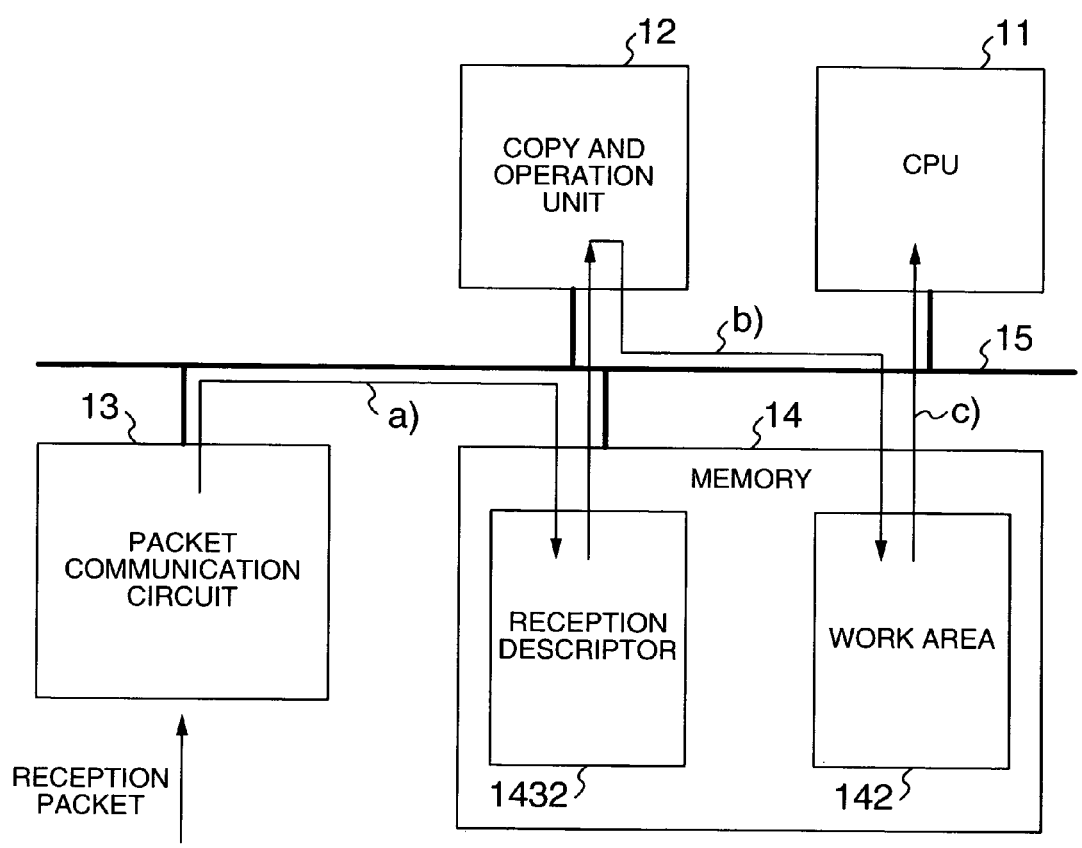
FIG. 6 is a diagram showing the flow of data when a packet is received by the packet communication apparatus according to the present invention.

FIG. 6 is a diagram showing the flow of data when the packet communication apparatus according to the present invention receives a packet.

(a) When a packet is received, the packet communication circuit 13 transfers it to the reception descriptor 1432 in the memory 14 via the bus 15 and notifies the CPU 11 that the packet is received.

(b) In response to the notification that the packet is received, the device driver in the CPU 11 starts the copy and operation unit 12. The copy and operation unit 12 reads the packet from the reception descriptor 1432, starts copying the packet into the specified area in the work area 142, analyzes the packet, and calculates the checksum of the IP packet and the checksum of the UDP packet or the TCP packet.

After copying the packet, the copy and operation unit 12 writes the checksum calculation result and information indicating whether a checksum error occurred, that is, whether one of the checksum calculation results is not 0, into the work area 142, and informs the CPU 11 that the checksum calculation has completed.

(c) The middleware executes the IP processing and the UDP processing or the TCP processing based on the checksum calculation result in the work area 142. After that, the application software such as the web server is executed.

If an error is detected in the checksum calculation result, the predetermined error processing is executed.

The present invention is characterized in that, during processing procedure (b), the copy and operation unit 12 copies the packet from the reception descriptor 1432 to the work area 142 and executes the checksum calculation of the IP packet and the UDP or TCP packet simultaneously.

This processing procedure enables the memory copy operation to be executed as fast as in DMA (Direct Memory Access) mode and, within that time, the checksum calculation to be completed.

Figure 7:
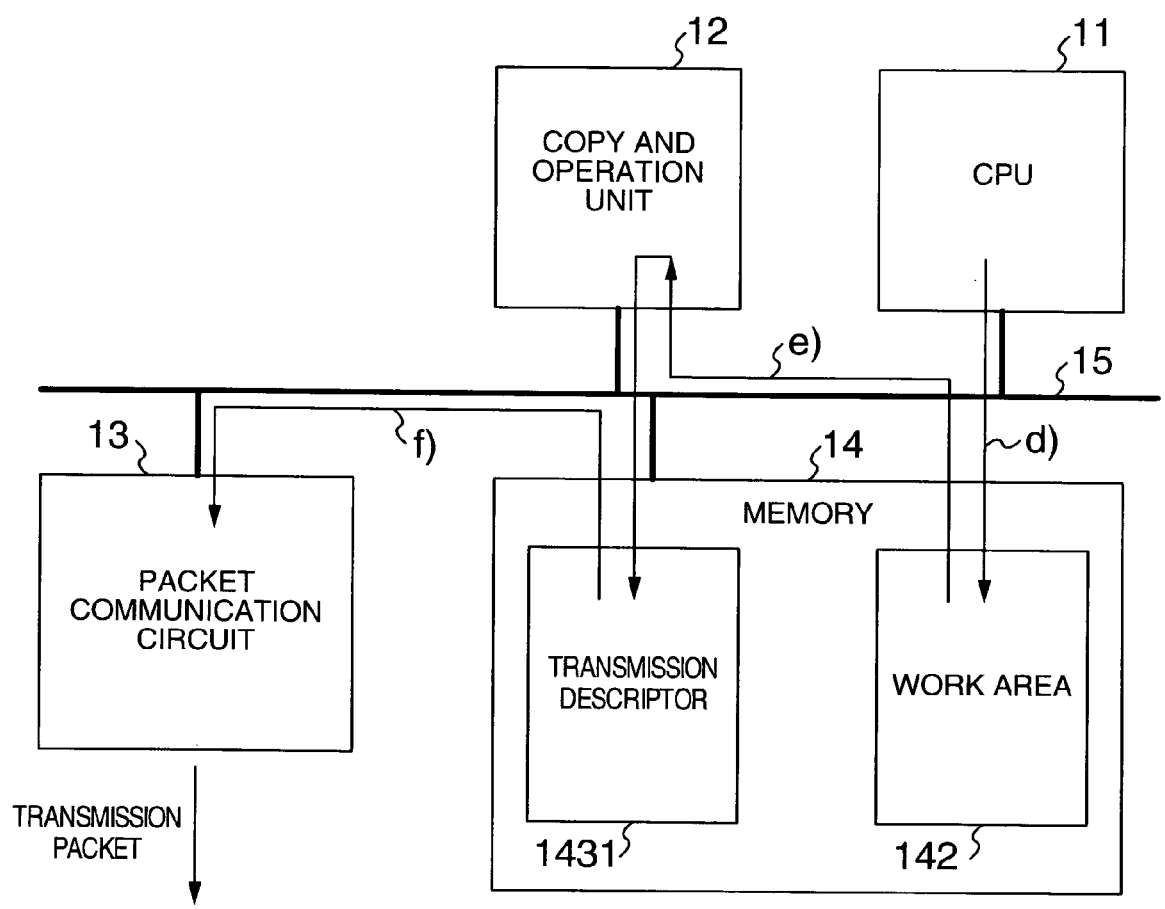
FIG. 7 is a diagram showing the flow of data when a packet is transmitted by the packet communication apparatus according to the present invention.

FIG. 7 is a diagram showing the flow of data when the packet communication apparatus according to the present invention transmits a packet.

(d) The communication middleware sequentially encapsulates the TCP (UDP) data, the IP data, and the Ethernet (registered trademark) data, which is output from application software such as a web server, to create an Ethernet (registered trademark) packet and places the Ethernet (registered trademark) packet in the work area 142.

(e) The device driver starts the copy and operation unit 12. The copy and operation unit 12 reads the Ethernet (registered trademark) packet from the work area 142 and starts copying the packet into the specified area in the transmission descriptor 1431. At the same time, the copy and operation unit 12 analyzes the packet and calculates the checksum of the TCP packet or the UDP packet and the IP packet.

After copying the packet, the copy and operation unit 12 writes the checksum calculation result into the checksum storage location of the packet in the transmission descriptor 1431 that is the copy designation and informs the CPU 11 that the checksum information has been written.

(f) Upon receiving the information that the checksum has been written, the device driver of the CPU 11 starts the packet communication circuit 13. The packet communication circuit 13 sends the packet stored in the transmission descriptor 1431 to the network 2.

When a packet is transmitted, the copy and operation unit 12 also copies the packet from the work area 142 to the transmission descriptor and calculates the checksum of the IP packet and UDP or TCP packet simultaneously.

During transmission processing, the time at which the checksum information is added to the packet created in the work area 142 is after the packet is copied to the transmission descriptor 1431. The packet in the work area 142 has no checksum information.

There are the following two solutions to the lack of the checksum information problem.

The first solution is that the copy and operation unit 12 writes the checksum calculation result not only in the packet in the transmission descriptor 1431 that is the copy destination but also in the packet in the work area 142 that is the copy source.

The second solution is that the copy operation and the checksum calculation executed by the copy and operation unit 12 are executed separately. First, the communication middleware calculates only the checksum and stores the result as the checksum information on the packet. After that, the copy and operation unit 12 copies the packet including the checksum information from the work area 142 to the transmission descriptor 1431.

The packet communication apparatus 1 includes the copy and operation unit 12 for executing the copy operation and the checksum calculation simultaneously. Therefore, the overhead incurred by the copy operation and the checksum calculation during the transmission/reception processing can be reduced.

Because the copy and operation unit 12 is started only by the device driver or a part of middleware depending on hardware, only the software depending on hardware including the device driver is required to be changed when the copy and operation unit 12 is installed.

Figure 8:
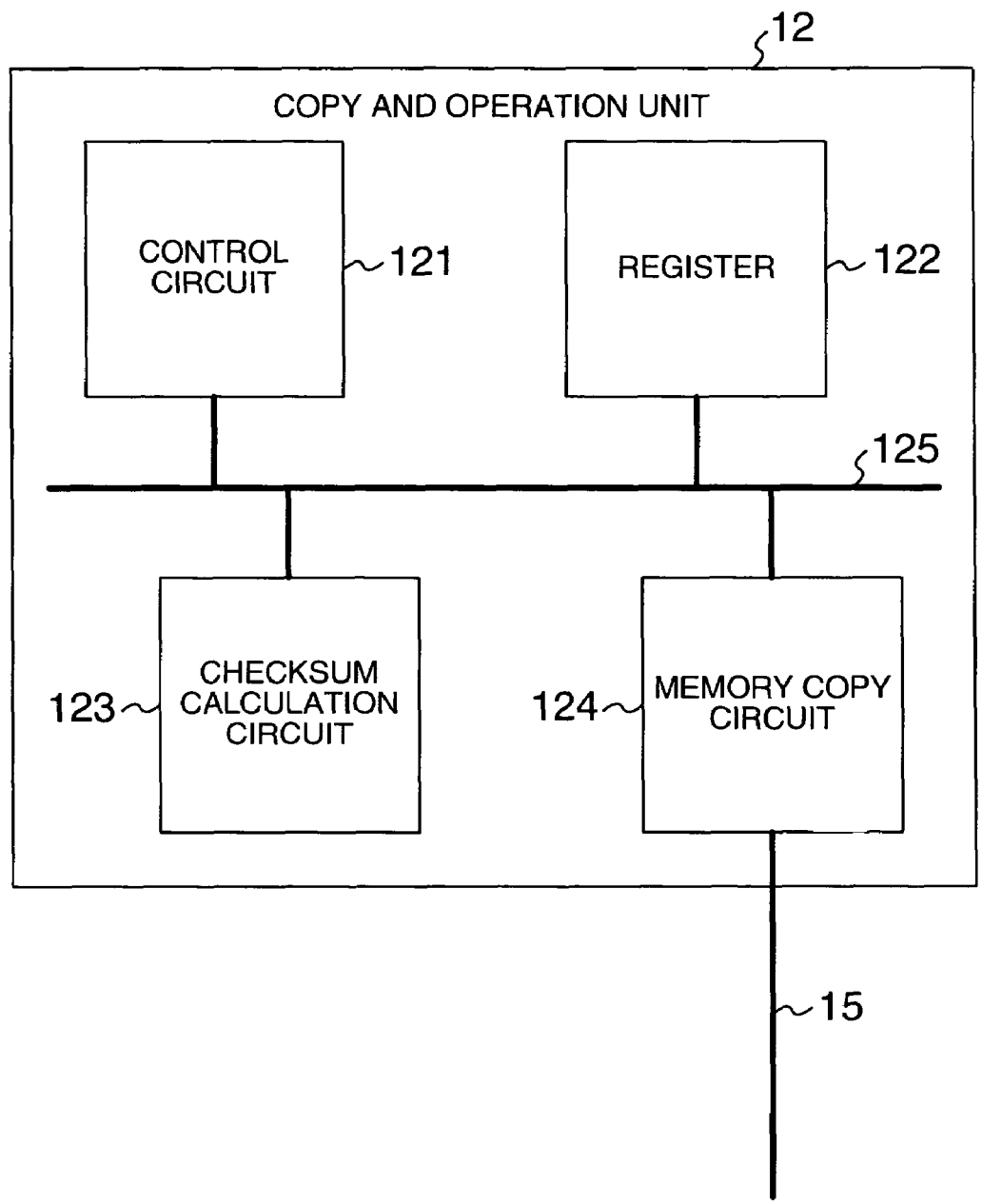
FIG. 8 is a block diagram showing the internal configuration of a copy and operation unit according to the present invention.

FIG. 8 is a block diagram showing the internal configuration of the copy and operation unit 12 according to the present invention.

The copy and operation unit 12 comprises a control circuit 121, registers 122, a checksum calculation circuit 123, a memory copy circuit 124, and a bus 125 that connects them together. The memory copy circuit 124 is connected to the bus 15.

The copy and operation unit 12 is executed in one of the following three modes: the mode in which the copy operation and the checksum calculation are executed simultaneously, the mode in which only the copy operation is executed, and the mode in which only the checksum calculation is executed. To increase the versatility, the checksum calculation circuit 123 can accept three checksum data lengths—16 bits, 8 bits, and 32 bits—and execute the operation in one of two types of complement addition—one's complement addition and the two's complement addition used by most CPUs.

The memory copy circuit 124 can also copy data in any of 8 bits, 16 bits, and 32 bits.

The registers 122, accessible from the CPU 11, include the status and the setting values of the copy and operation unit 12.

The registers 122 include a start request register that is activated by the CPU 11, the operation mode (copy and checksum calculation, copy only, checksum calculation only) of the copy and operation unit 12, the operation mode of the checksum calculation circuit 123, the data width (8/16/32 bits) executed by the memory copy circuit 124, the copy destination and copy source of the packet, the start address of the area in which the checksum calculation result is stored, and the individual address.

The checksum storage location is determined as follows. When a packet is received, the checksum calculation result is written in the work area 142 to allow the CPU 11 to check it. Therefore, the continuous writing method is used in which the checksum calculation results are stored in the storage area whose start address is included in the registers 122. When a packet is transmitted, the checksum calculation result is stored in the packet in the transmission descriptor 1431 to which the packet is copied. Therefore, the individual address specification method is used.

In the individual address specification method, the registers 122 include up to three addresses. If more than three addresses are used, those addresses are stored in an area in the memory 14 and the start address of the area is stored in the registers 122.

Therefore, this configuration allows a plurality of checksum calculations to be performed in one packet.

The control circuit 121 is the core of the copy and operation unit 12. When the start request register in the register 122 is set, the control circuit 121 instructs the checksum calculation circuit 123 and/or the memory copy circuit 124 to start the copy and/or checksum calculation.

The control circuit 121 checks the packet data on the bus 125, analyzes the structure of the packet read by the memory copy circuit 124, and controls the checksum calculation circuit 123 to calculate the checksum of each packet.

The memory copy circuit 124 operates in the DMA (Direct Memory Access) mode. In response to an instruction from the control circuit 121, the memory copy circuit 124 sequentially copies the specified length (8/16/32 bits) of packet data from the copy source, set by the register 122, to the copy destination and outputs the packet data to the bus 125.

When the copy and operation unit 12 is in the operation mode in which only the checksum is calculated, the memory copy circuit 124 only outputs the packet data, read from the memory, to the bus 125 but does not copy it.

Figure 9:
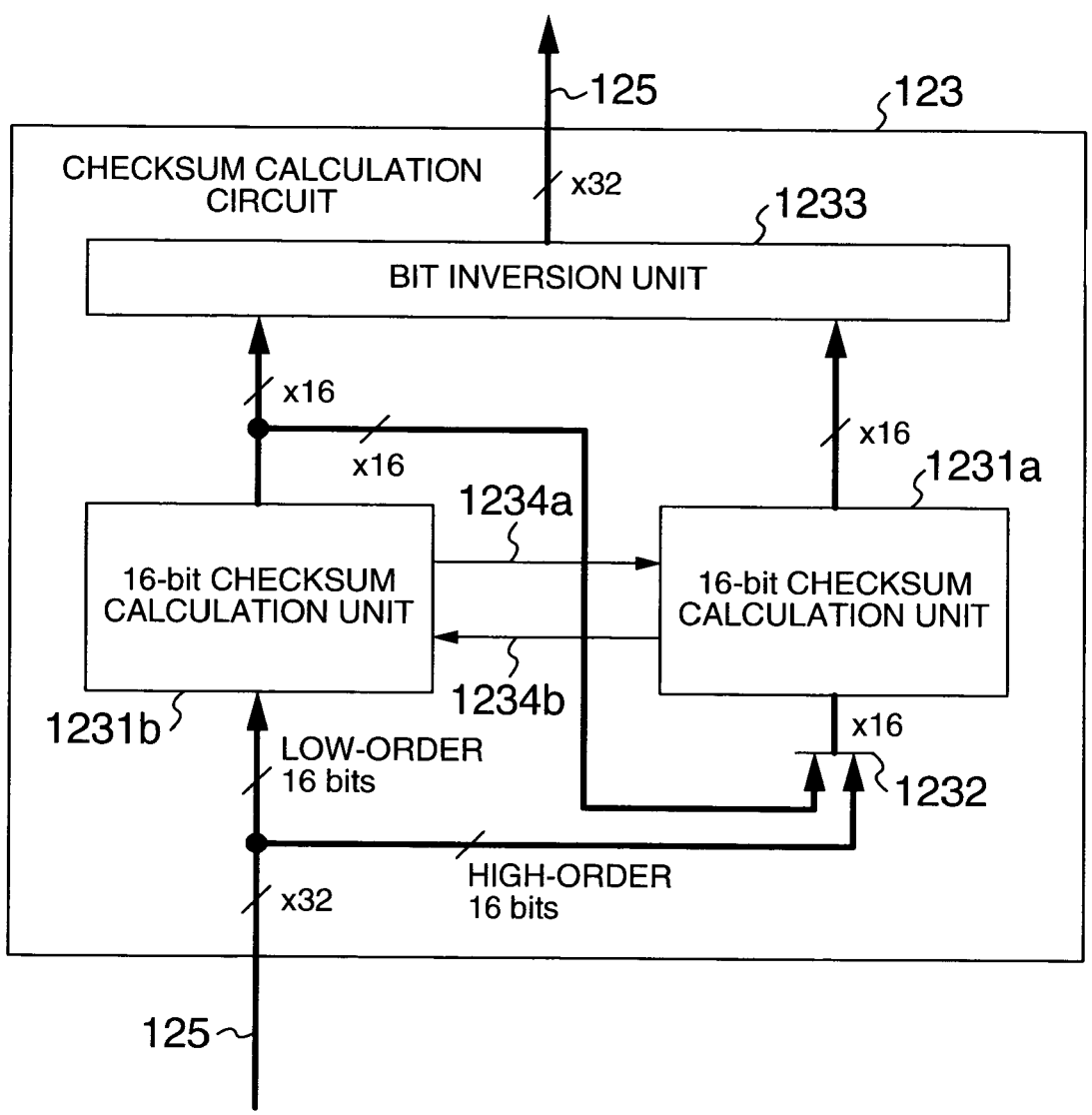
FIG. 9 is a block diagram showing the internal configuration of the checksum calculation circuit of the copy and operation unit in FIG. 8.

FIG. 9 is a block diagram showing the internal configuration of the checksum calculation circuit 123 of the copy and operation unit shown in FIG. 8.

The checksum calculation circuit 123 comprises two 16-bit checksum calculation units 1231a and 1231b, a selector 1232, and a bit inversion unit 1233. The 16-bit checksum calculation units 1231 are adders capable of performing one's complement and two's complement of 16 bits.

The low-order 16 bits of the 32-bit packet data received from the bus 125 are input to the calculation unit 1231b. The high-order 16 bits and the output of the calculation unit 1231b are input to the calculation unit 1231a via the selector 1232.

A carry signal 1234 output from the calculation unit 1231b is input to the calculation unit 1231a.

The bit inversion unit 1233 receives the output from the calculation unit 1231b as the low-order 16 bits, receives the output of the calculation unit 1231a as the high-order 16 bits, and inverts the 32 bits.

The checksum calculation circuit 123 calculates the 16-bit checksum in 32 bits at a time to increase the operation speed.

The 16-bit checksum is calculated as described below.

First, the selector 1232 selects the bus 125. The data for which checksum calculation is to be performed is sent, 32 bits at a time, to the checksum calculation circuit 123.

In the checksum calculation circuit 123, the 32-bit data received from the bus 125 is divided into the high-order 16 bits and the low-order 16 bits. The two 16-bit checksum calculation units 1231a and 1231b calculate the checksum of the 16 bits, respectively.

After all data for which the checksum calculation is to be performed is sent to the checksum calculation circuit 123, the selector 1232 selects the output of the 16-bit checksum calculation unit 1231b and combines the two checksum calculation results into one in the calculation unit 1231a. The bit inversion unit 1233 inverts the two checksum calculation results, which is combined into one, on a bit basis and outputs the result to the bus 125 as the 16-bit checksum calculation result and ends the checksum calculation.

A carry output 1234b from the checksum calculation unit 1231a is input to the checksum calculation unit 1231b, and a carry output 1234a from the checksum calculation unit 1231b is input to the checksum calculation unit 1231a.

Connecting the checksum calculation units 1231a and the 1231b together enables the checksum calculation circuit 123 to operate as a 32-bit checksum calculation unit.

To calculate the 8-bit checksum, the checksum calculation unit 1231 is operated as two 8-bit checksum calculation units. This increases the versatility of the checksum calculation circuit.

With reference to the configuration of an Ethernet (registered trademark) packet shown in FIG. 5, the following describes the operation executed when the copy and operation unit 12 that receives an Ethernet (registered trademark) packet.

(1) When started by the CPU 11, the control circuit 121 starts the memory copy circuit 124. The memory copy circuit 124 starts the copy operation based on the contents set in the register 122, copies the packet data read from the reception descriptor 1432 to the work area 142 and, at the same time, outputs it to the bus 125. Because the header of the Ethernet (registered trademark) packet does not require the checksum calculation, the checksum calculation circuit 123 is in the stopped state.

(2) The control circuit 121 starts checking the packet data output to the bus 125. As shown in FIG. 5(a), the type information indicating that the packet is encapsulated into an Ethernet (registered trademark) packet immediately follows the transmission source address. The control circuit 121 reads this type information, recognizes that the next packet is an IP packet and, based on the IP header configuration that is known information, obtains the information on the location of the type information within the IP header and the information on the location where the IP data starts, that is, the location on the checksum calculation end point.

(3) When the IP header, which is the first part of the Ethernet (registered trademark) data, flows along the bus 125, the control circuit 121 starts the checksum calculation circuit 123 and waits for the type information included in the IP header. From the type information, the control circuit 121 recognizes that the data is a TCP header and obtains the length of the TCP packet, that is, the checksum calculation end point.

(4) When the IP header data flow ends, the control circuit 121 obtains the checksum calculation result from the checksum calculation circuit 123. The control circuit 121 stores the checksum calculation result at the address specified by the register 122 and, at the same time, resets the checksum calculation circuit 123 for the checksum calculation of the TCP packet.

(5) When the whole TCP packet has flowed, the control circuit 121 stores the checksum calculation result of the TCP packet at the specified address as in (4), stops the memory copy circuit 124, and ends the packet copy operation.

As described above, the packet communication apparatus according to the present invention copies an Ethernet (registered trademark) packet, created by encapsulating a received TCP/IP packet, from the reception descriptor 1432 to the work area 142 and, at the same time, calculates the checksum of the IP packet (IP header) and the TCP header.

When a packet is transmitted, the copy and operation unit 12 operates in the same manner as when a packet is received except that the checksum is written not in the work area 142 but in the checksum storage location within the IP header and the TCP header of the packet copied to the transmission descriptor 1431.

For faster processing, the control circuit 121 has information on the header structure of typical protocols including IP (IPv4), TCP, and IPv6 in advance. To process the packets of other protocols, a table is built in the memory 14 to store the header configuration or the CPU 11 performs processing for those packets.

The values of type information on a packet encapsulated into an Ethernet (registered trademark) packet are defined by RFC1700.

When a packet is copied, the memory copy circuit 124 of the copy and operation unit 12 can add the header and the tail to a packet to encapsulate the packet or delete the header and the tail from a packet to de-capsulate the packet based on the contents set in the register 122 in advance.

Therefore, it is possible to change an Ethernet (registered trademark) packet to a packet of other communication means such as wireless means (IEEE 802.11) for use with that communication means.

The packet communication apparatus according to the present invention is designed with focus on the fact that the most remains unchanged except the transmission source address and transmission destination address.

During the reception processing in which a packet is de-capsulated, the reception packet is copied except its header. The data of the packet, the transmission source address and the transmission destination address, and the data length are written in the work area 142.

At this copy time, the copy and operation unit 12 calculates the length (in bytes) of the packet including the header and the length (in bytes) of the data part except the header.

If used for the packet processing that is performed next by the communication middleware, this calculation result makes the processing easy and fast.

Next, when a packet is encapsulated for transmission, the header is added to the transmission data composed of data to be transmitted, the transmission source address, and the transmission destination address. The header and the transmission data are then copied to the transmission descriptor 1431. The transmission data length is calculated and written in the data length area in the added header.

The processing described above eliminates the need for the communication middleware to encapsulate a packet and increases the communication performance.

The operation of the copy and operation unit 12 that is executed when it receives a packet will be described with reference to FIG. 6.

(a) Upon receiving a packet, the packet communication circuit 13 transfers the received packet to the reception descriptor 1432 in the memory 14 via the bus 15 and notifies the CPU 11 that the packet is received.

(b) The device driver in the CPU 11 starts the copy and operation unit 12. The copy and operation unit 12 reads the packet from the reception descriptor 1432 and starts copying the packet to the specified area in the work area 142. At the same time, the copy and operation unit 12 analyzes the configuration of the packet, divides the packet into the header part and the data part, and copies them to the work area 142. The copy and operation unit 12 obtains the transmission source address and the transmission destination address and calculates the data length. After the copy is finished, the copy and operation unit 12 writes the data length, the transmission source address, and the transmission destination address into the work area 142 and notifies the CPU 11 that the data length and the addresses are written.

(c) The communication middleware performs processing using the values of the data length, the transmission source address, and the transmission destination address stored in the work area 142. After that, the application software such as the web server is executed. Because a packet is already de-capsulated, the communication middleware that is required only to process the data can perform reception processing more speedily. Even if processing for the header is required, the header that is already copied to the work area 142 can be processed.

With reference to FIG. 7, the operation of the copy and operation unit 12 when a packet is transmitted will be described.

(d) Data output from the application software such as the web server is processed by the communication middleware and is stored in the work area 142. The data stored in the work area 142 is encapsulated in an IP packet or an Ethernet (registered trademark) packet.

(e) The device driver in the CPU 11 writes the transmission source address and the transmission destination address into the work area 142 and starts the copy and operation unit 12. The copy and operation unit 12 reads the data from the work area 142 and starts copying it into the specified area in the transmission descriptor 1431. At this time, the copy and operation unit 12 copies the header, composed of the transmission destination address and the transmission source address read from the work area 142, to the transmission descriptor 1431, copies the data part, and then creates an encapsulated packet.

(f) The copy and operation unit 12 adds the header to the data transmitted by the CPU 11 to create an encapsulated packet. That is, the copy and operation unit 12 copies the header part to the transmission descriptor 1431 and, after that, copies the IP packet data part. At this time, the copy and operation unit 12 calculates the length of the packet copied to the transmission descriptor 1431. After copying the packet, the copy and operation unit 12 writes the calculated packet length in the specified area in the packet in the transmission descriptor 1431 to which the packet is copied and notifies the CPU 11 that the placket length is written.

(g) In response to the notification that the packet length is written, the device driver starts the packet communication circuit 13. The packet communication circuit 13 transmits the wireless packet stored in the transmission descriptor 1431.

When transmission data is copied from the work area 142 to the transmission descriptor 1431, the copy and operation unit 12 converts the data into a wireless packet and calculates the packet length according to the processing procedure described above.

The copy and operation method described above can be used to encapsulate data not only into a wireless LAN communication packet but also into other communication packets.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet communication apparatus used with a memory having a first storage area and a second storage area, comprising:
   a CPU (Central Processing Unit);
   a packet communication circuit that transmits and receives packets via a network;
   communication software executed by said CPU;
   the first storage area provided in said memory and controlled by said communication software;
   the second storage area provided in said memory and controlled by said packet communication circuit; and
   an operation unit that operates with said communication software to copy a transmission packet, stored in the first storage area, to a descriptor area provided in the second storage area and controlled by said packet communication circuit and, at the same time, performs checksum operation for the transmission packet,
   wherein said packet communication circuit outputs the transmission packet, which is written by said CPU or said operation unit into the second storage area and for which the operation is performed, to the network, wherein, when no checksum information is present in a packet in the first storage area, said operation unit writes a result of a checksum calculation in the packet stored in the second storage area to which the packet is copied as well as in the packet in the first storage area from which the packet is copied.

2. The packet communication apparatus according to claim 1,
wherein said packet communication circuit stores reception packets, received via the network, in the second storage area in said memory, and
wherein said operation unit copies the reception packets, stored in the second storage area, to the first storage area and, at the same time, performs the operation for the reception packets.

3. The packet communication apparatus according to claim 1,
wherein said CPU has a switching command that allows said operation unit to switch between a mode in which the transmission packets or the reception packets are only copied and a mode in which only the operation is performed for the transmission packets or the reception packets.

4. The packet communication apparatus according to claim 1,
wherein said operation unit is a checksum calculation unit that performs an operation for the transmission packets or the reception packets.

5. The packet communication apparatus according to claim 4,
wherein said checksum calculation unit allows a data length of an operation target to be varied.

6. The packet communication apparatus according to claim 5,
wherein, when no checksum information is present in a packet in the first storage area, said operation unit writes a result of a checksum calculation in the packet stored in the second storage area to which the packet is copied as well as in the packet in the first storage area from which the packet is copied.

7. A packet communication apparatus comprising:
a memory having a first storage area and a second storage area;
a CPU;
a packet communication circuit that transmits and receives packets via a network;
communication software executed by said CPU;
the first storage area provided in said memory and controlled by said communication software;
the second storage area provided in said memory and controlled by said packet communication circuit; and
an operation unit that operates with said communication software to copy a transmission packet, stored in a work area for said CPU provided in the first storage area, to a descriptor area provided in the second storage area and controlled by said packet communication circuit and, at the same time, performs checksum operation for the transmission packet, and
wherein said packet communication circuit outputs the transmission packet, which is written by said CPU or said operation unit into the second storage area and for which the operation is performed, to the network,
wherein, when no checksum information is present in a packet in the first storage area, said operation unit writes a result of a checksum calculation in the packet stored in the second storage area to which the packet is copied as well as in the packet in the first storage area from which the packet is copied.

8. The packet communication apparatus according to claim 7,
wherein said packet communication circuit stores reception packets, received via the network, in the second storage area in said memory, and
wherein said operation unit copies the reception packets, stored in the second storage area, to the first storage area and, at the same time, performs the operation for the reception packets.

9. The packet communication apparatus according to claim 7,
wherein said CPU has a switching command that allows said operation unit to switch between a mode in which the transmission packets or the reception packets are only copied and a mode in which only the operation is performed for the transmission packets or the reception packets.

10. The packet communication apparatus according to claim 7,
wherein said operation unit is a checksum calculation unit that performs an operation for the transmission packets or the reception packets.

11. The packet communication apparatus according to claim 10,
wherein said checksum calculation unit allows a data length of an operation target to be varied.

12. The packet communication apparatus according to claim 11,
wherein, when no checksum information is present in a packet in the first storage area, said operation unit writes a result of a checksum calculation in the packet stored in the second storage area to which the packet is copied as well as in the packet in the first storage area from which the packet is copied.

* * * * *